(12) United States Patent
Banerjee et al.

(10) Patent No.: US 11,593,543 B2
(45) Date of Patent: Feb. 28, 2023

(54) GLITCH POWER ANALYSIS WITH REGISTER TRANSFER LEVEL VECTORS

(71) Applicant: Synopsys, Inc., Mountain View, CA (US)

(72) Inventors: Joydeep Banerjee, Karnataka (IN); Debabrata Das Roy, Karnataka (IN)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 17/192,420

(22) Filed: Mar. 4, 2021

(65) Prior Publication Data

US 2021/0279392 A1 Sep. 9, 2021

(30) Foreign Application Priority Data

Mar. 4, 2020 (IN) .............................. 202041009292

(51) Int. Cl.
*G06F 30/3315* (2020.01)
*G06F 30/337* (2020.01)
*G06F 119/06* (2020.01)
*G06F 119/12* (2020.01)

(52) U.S. Cl.
CPC ........ *G06F 30/3315* (2020.01); *G06F 30/337* (2020.01); *G06F 2119/06* (2020.01); *G06F 2119/12* (2020.01)

(58) Field of Classification Search
CPC ............... G06F 30/3315; G06F 30/337; G06F 2119/06; G06F 2119/12; G06F 30/3308; G06F 30/3312
See application file for complete search history.

(56) References Cited

U.S. PATENT DOCUMENTS

| 5,625,803 A * | 4/1997 | McNelly | G06F 30/33 703/14 |
| 6,324,679 B1 * | 11/2001 | Raghunathan | G06F 30/30 716/133 |
| 2002/0100006 A1 * | 7/2002 | Kosugi | G06F 30/33 716/108 |
| 2017/0004244 A1 * | 1/2017 | Paik | G06F 30/39 |
| 2019/0138677 A1 * | 5/2019 | Peng | G06F 30/33 |

OTHER PUBLICATIONS

Pat Sheridan, "Which Glitch is Which?", https://semiengineering.com/which-glitch-is-which/ (Year: 2019).*
International Search Report and Written Opinion from International Application No. PCT/US2021/020889 dated Jun. 30, 2021—35 pages.

(Continued)

*Primary Examiner* — Jack Chiang
*Assistant Examiner* — Aric Lin
(74) *Attorney, Agent, or Firm* — Lewis Roca Rothgerber Christie LLP (57) ABSTRACT

A method includes acquiring a vector data signal associated with a circuit design, performing a timing update to determine timing information for the circuit design, and identifying a glitch in the circuit design based on a shifted vector waveform. The timing information includes a signal delay associated with a cell of the circuit design. The shifted vector waveform is generated by shifting the vector data signal based on the timing information.

18 Claims, 6 Drawing Sheets

(56) References Cited

OTHER PUBLICATIONS

P. Sheridan, "Which Glitch is Which," in *Semiconductor Engineering*, pp. 1-3, 2019.
S. Bathla el al., "A Simulation-Based Metric to Guide Glitch Power Reduction in Digital Circuits," in *IEEE Transactions on Very Large Scale Integration (VLSI) Systems*, vol. 27, No. 2, pp. 376-386, 2019.
L. Wang et al., "A Gate Sizing Method for Glitch Power Reduction," in *Proceedings of The International IEEE SOC Conference*, pp. 24-29, 2011.

* cited by examiner

GLITCH POWER ANALYSIS WITH REGISTER TRANSFER LEVEL VECTORS

RELATED APPLICATION

The present application claims priority under 35 U.S.C. § 119(a) to Indian Patent Application No. 202041009292, filed on Mar. 4, 2020, which is incorporated herein by reference in its entirety for all purposes.

TECHNICAL FIELD

The present disclosure relates to an electronic design automation (EDA) system. In particular, the present disclosure relates to glitch power analysis with register transfer level (RTL) vectors.

BACKGROUND

Due to the ever-increasing complexity of new integrated circuit (IC) devices, electronic design automation (EDA) software tools are now used in the process of converting each new electronic system idea into a corresponding IC device using one or more IC "chips". IC designers utilize EDA tools to develop an initial circuit design (i.e., software-based description of an IC device) that they believe is capable of implementing a new electronic system idea, to analyze and modify the initial circuit design in order to verify that the final design performs the operational objectives set for the electronic system idea, and then to generate and check a series of IC layouts (i.e., mask designs or mask layouts) that define a physical IC chip capable of implementing the final circuit design. Because modern IC devices, such as System-on-Chip (SoC) devices, can comprise billions of individual circuit components, there is no practical way to develop and produce modern IC devices without the use of EDA tools.

Many EDA software tools include sub-tools that generate power consumption estimations, which are then used to optimize the power consumption characteristics of the pre-silicon circuit designs. Low power consumption constraints are often given comparable weight as other design flow metrics (e.g., high-speed computation performance, small silicon area, and short time-to-market scheduling) due to the demand for low power consumption in mobile devices to preserve battery life, and more recently in non-battery-operated devices for purposes of circuit reliability and costs associated with packaging and cooling solutions. To meet this increased emphasis on power consumption, digital simulation tools are utilized to estimate (predict) the power consumption of a post-fabrication (physical) IC device by simulating operation of the associated software-based circuit design. The estimated power consumption data can be used to optimize the circuit design to meet power consumption constraints before incurring the time delay and high cost of fabrication.

SUMMARY

In one aspect, a method includes acquiring a vector data signal associated with a circuit design, performing a timing update to determine timing information for the circuit design, and identifying a glitch in the circuit design based on a shifted vector waveform. The timing information includes a signal delay associated with a cell of the circuit design. The shifted vector waveform is generated by shifting the vector data signal based on the timing information.

In one aspect, a system includes a memory storing instructions; and a processor, coupled with the memory and to execute the instructions. The instructions when executed cause the processor to acquire a vector data signal associated with a circuit design, perform a timing update to determine timing information for the circuit design, and identify a glitch in the circuit design based on a shifted vector waveform. The timing information includes a signal delay associated with a cell of the circuit design. The shifted vector waveform is generated by shifting the vector data signal based on the timing information.

Further features of the present disclosure, as well as the structure and operation of various embodiments, are described in detail below with reference to the accompanying drawings. It is noted that the present disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to glitch power analysis with register transfer level (RTL) vectors. The approaches described herein may be used by electronic design automation (EDA) software tools to perform power consumption analysis during circuit design development that may be utilized to enhance power consumption characteristics (e.g., to lower power consumption) of the resulting integrated circuit (IC) devices.

Digital simulation tools utilized to perform pre-silicon power consumption estimation that are in use today typically use a logic simulation/emulation tool along with a power calculator. Early digital simulation tools utilized traditional circuit design simulation techniques to perform power estimation, which arguably provides accurate estimation of actual silicon measurements. However, the runtime and memory capacity required to perform traditional circuit design simulation can no longer support the complexity of today's (System-on-Chip) SoC devices.

To address this problem, the simulation tools provided in many of EDA software tools perform functional simulation processes (e.g., gate-level, standard delay format-annotated (SDF-annotated) digital circuit simulations) that measure switching activity and provide data in the form of toggle count values. Each unit (toggle) of a toggle count represents a quantity of power consumed when a given cell undergoes a switching operation (e.g., changes its output state). The switching operation generates a signal edge or a signal pulse that is transmitted on a signal path to another cell. A total power consumption of the given cell can be determined using pre-measured power consumption amounts. For example, when the input signal to an inverter changes from low (e.g., 0 V) to high (e.g., 1 V), the inverter undergoes a switching operation to change its output from high to low. The inverter's toggle count is determined by detecting and counting the number of switching operations performed by the inverter during a power simulation session. The total power consumption of the inverter can then be calculated by multiplying the inverter's toggle count by a unit power consumption amount determined by measuring previously fabricated inverters having the same size and type of transistors. The total power consumption of a circuit design is similarly estimated by generating a total toggle count including the switching operations of all cells of the circuit design during a simulation period, and by multiplying the toggle count by corresponding unit power consumption amounts.

Digital simulator tools used to perform pre-silicon power consumption estimation are developed for IC devices fabricated using complementary metal oxide semiconductor (CMOS) and other fabrication technologies in the amount of power consumed by glitches accounted for a very small percentage of total power consumption. The term "glitch" may refer to undesired transitions (signal pulses of short duration) that occur before a signal settles to its intended voltage level. Glitches may result from a fault or a design error. Glitches may also be unavoidable because not all signals that are part of a design feature change value at the same time. Glitches typically occur in the presence of a race condition in a digital logic circuit. For example, when a signal is based on two other signals which are based on a common signal, the glitch can occur if there is a delay in the arrival of one of the two signals.

Although glitches consume power in physical IC devices (just like valid data signal pulses), glitches were largely ignored by early simulation tools that performed pre-silicon power consumption estimation for IC devices fabricated using early CMOS and other fabrication technologies in which current leakage accounts for a substantially larger percentage of total power consumption than glitches. The power consumed by glitches in CMOS devices accounted for a very small percentage of total power consumption, so the rough estimate of glitch-based power consumption provided by some simulation tools was considered adequate. As such, circuit design modifications employed to meet power constraints often focus on reducing the size or changing the type of selected transistors to reduce power consumption.

As fabrication technologies continue to evolve, miscorrelation between pre-silicon power estimations generated by power simulation approaches and post-fabrication (real, physical) silicon measurements is becoming more pervasive and pronounced due at least in part to the use of overly simplified glitch modeling techniques. As mentioned above, current leakage accounts for a larger percentage of power consumed by IC devices fabricated using fabrication technologies such as CMOS. In comparison, modern fin field-effect transistor (FinFET) fabrication processes produce IC devices that exhibit a significant reduction in the leakage power component of total power consumption. The power consumption associated with other factors, such as glitches, accounts for a significantly larger percentage of the total power consumption calculation. In some cases, the glitch power can range from 20-40% of the total power consumption by the circuit design. Glitch modeling techniques utilized in digital simulation tools to perform pre-silicon power consumption estimation generally allow a user either to entirely filter out glitches that occur during power simulation, or to entirely propagate glitches that occur during power simulation.

A circuit design typically includes two types of glitches: very short duration non-propagating glitches that are effectively canceled immediately after their generation, and longer duration "functional" glitches that propagate along the circuit paths like regular signal transitions. Because the practice of filtering out all glitches entirely cancels both non-propagating and functional glitches, this approach has been found to produce too-low toggle counts that generate optimistic power consumption estimates. This can result in physical IC devices that do not meet targeted power consumption constraints (i.e., this approach can cause much higher power dissipation in the IC device than what was actually budgeted for). Conversely, the practice of propagating both non-propagating and functional glitches has been found to produce too-high toggle counts that generate pessimistic power consumption estimates, which in turn increase total manufacturing costs by way of unnecessary over-design and produce release schedule delays.

There are techniques available to analyze the integrated circuit statically based on delay differences of maximum and minimum signal arrival times at transistor inputs, and use transistor delays to detect potential glitch generations and thereby taking necessary steps to avoid glitches. However, the analysis being a predictive in nature suffers from accuracy when measured against actual circuit simulations with real time operating stimulus. Some circuit simulations on the lower level of abstraction use real operating condition stimulus and accurate delay information from sign-off quality timing analysis. However, such circuit simulations are computationally intensive, and also possess setup challenges requiring going back and forth between timing analysis environment and simulation environment which typically are run completely separate and independent of each other. This makes it impractical to run this multiple times during various stages of design cycles to capture the potential problems and resolve at that stage.

What is needed is a more accurate method for detecting glitch generation in a circuit design and analyzing associated glitch power consumption to minimize power miscorrelations between pre-silicon power consumption estimation and post-silicon power consumption measurements resulting from glitch modeling approaches. The methods and systems of the present disclosure determine glitch power consumption while staying within analysis environment (i.e., without requiring additional input data other than that provided in the high-level and low-level abstractions typically included in circuit design source files) and without requiring multiple circuit simulations.

The methods and systems described herein perform glitch detection and associated power analysis at the signoff stage of circuit development that provides glitch power consumption estimates comparable to those generated by gate level simulation/standard delay format (GSL/SDF) approaches, but in substantially less processing time.

In some embodiments, an EDA software tool is configured to use RTL zero-delay vectors and static timing analysis (STA) timing data (e.g., delay, slew) to simulate an incremental progress of vector data signals through combinatorial logic gates of a circuit design. The STA timing data is used to accurately predict actual signal delays caused by each combinatorial logic gate. Glitches are captured due to difference in arrival times of signals. Glitches are filtered and propagated through the design. Average and peak power calculation are a function of the power due to the glitches. Thus, accurate glitch detection and associated power analysis can be determined.

Experimental data shows that approaches described herein estimate glitch power in substantially less processing time (i.e., in comparison with glitch power analysis approaches using GSL simulations and SDF data). Further, a total glitch power estimate determined using the approaches described herein is within a few percent of those generated by glitch power approaches.

The efficient glitch detection and power analysis method described herein provides several benefits over other approaches. First, it enables designers to analyze glitches and glitch power consumption much earlier in the design process (i.e., using the RTL vectors and current STA timing data), and may also be used during sign-off (i.e., using STA timing data for the finalized circuit). The efficient glitch detection and power analysis method also reliably produces total power analysis results that are within 1% of gate-level SDF simulated results while requiring less runtime, memory and storage. SDF simulation is very runtime/memory intensive and requires other input data files (e.g., RTL test bench, library Verilog model) which is not readily available at all stages in the RTL-GDS2 (graphic design system 2) flow. Moreover, SDF simulations are typically performed using special tools, and the output of SDF simulation (i.e., gate-level FSDB/VCD) is fed to yet another analysis tool to perform power analysis, which makes SDF-based glitch power analysis very runtime intensive and error prone (i.e., the need to use different tools greatly increases the chance of environment mismatch software failures, which greatly increase overall processing time). The approaches described herein allows users to perform gate-level glitch power analysis using RTL vectors in a seamless manner that significantly reduces the chances of environmental mismatch failures in comparison to SDF-based glitch power analysis, while providing simulation results that are very accurate.

The method may also be used to generate shifted waveforms based on high-quality STA timing data. The shifted waveforms may be used to identify which nets have glitches and the number of glitches. The number of glitches in each net may be a function of the number of propagated glitches as described further below. The shifted waveforms may also be used to filter data to understand the severity based on glitch duration and power consumption, and remove glitches and recover power through engineering change order (ECO) cell re-sizing and buffer insertion.

In some embodiments, STA timing data for various nodes of a target circuit design are generated for a given circuit design using vector waveforms. The vector waveforms may be generated using a high-level (e.g., RTL or gate-level) simulation process. Next, the operation of sensitized signal paths are simulated using a modified RTL simulation process in which data signals are chronologically incrementally shifted in accordance with the STA timing data. In some aspects, data signals are generated and incrementally and chronologically propagated along corresponding branches of each sensitized signal path of the circuit design (i.e., the instantaneous "location" of transmitted data signals along their corresponding signal paths is determined for each timestamp/moment). When a given data signal encounters a logic gate or other delay-producing element disposed in its associated signal path, propagation of the data signal through the gate/element is determined by its associated STA timing data. Thus, the zero-delay vector waveforms are shifted using the STA timing data. This activity delay shifting process utilizes readily available zero-delay vectors from simulation (e.g., RTL, gate-level) and then shifts the waveform for each and every signal based on delay information provided by gate-level static timing analysis (STA). The resulting vectors provide sufficient accuracy to identify glitches and glitch power much earlier in the design process, without waiting for full gate level SDF simulations to be available.

In some embodiments, glitches may occur due to convergence in a logic cone, where the arrival of transitions in one branch comes earlier than in the other branch, thereby creating temporary transitions at the output. For example, glitch events may arise on combinational cell outputs due to input signals arriving at different times. For any combinational cell with more than one input. There may be multiple intermediate output transitions depending on the order in which the input events arrive. Glitch events that occur during the simulation/propagation process are incrementally propagated along the sensitized signal paths of the circuit design in accordance with the STA timing data.

In some embodiments, glitches can occur on a cell with/without the output switching at a given timestamp. Data signals are chronologically incrementally propagated during the simulation/propagation process. The arrival time of each data signal is calculated using design specific path delay data for every combinational cell at a given timestamp. These arrival times are then processed to determine the order in which the input signals arrive, thereby facilitating the detection of glitch events. For each of the glitch event, the arrival times using the path delay triggering the glitch event is determined. Two types of glitch events generated on a cell output are identified: a first type and a second type. Glitch pulses of the first type have a pulse width greater than the averaged output transition (similar to transport glitches). Glitch pulses of the second type have a glitch pulse width shorter than averaged output transition (similar to inertial glitches).

In some embodiments, glitch events of the first type are considered as full transitions. In some aspects, glitch events of the first type may be processed as regular toggles during power calculation. In some aspects, a glitch scaling ratio may be determined for glitch events of the second type. The glitch scaling ratio is determined based on the output pulse width and an average slew. The scaling ratio may be used to determine a de-rated toggle rate (glitch rate) and de-rated dynamic power associated with the glitch events.

In some embodiments, the glitch signals generated by a combinational cell are propagated to the next gate/element of the cell's output signal path. In some aspects, glitch events are propagated like regular events through a fanout logic cone. All types of glitches (i.e., first type or transport glitches and second type or inertial glitches) are propagated. In some embodiments, glitch filtering is applied based on the cell delay while propagating glitches throughout the design.

For example, a glitch filter ratio may be used with a default value of 50% (i.e., pulses with pulse width less than 50% of cell delay are not be propagated to the cell output). The glitch filter ratio may be configured by the user. Additionally or alternatively, the glitch filter ratio may be automatically adjusted based on experimental results or a desired level of accuracy. Glitch propagation is expected to happen on the combinational paths only. In some embodiments, power calculation for propagated glitches may be similar to the power calculation for the generated glitches. Thus, glitch scaling may be used for inertial glitches (second type) and full transition power may be used for transport glitches (first type).

Figure 1A:
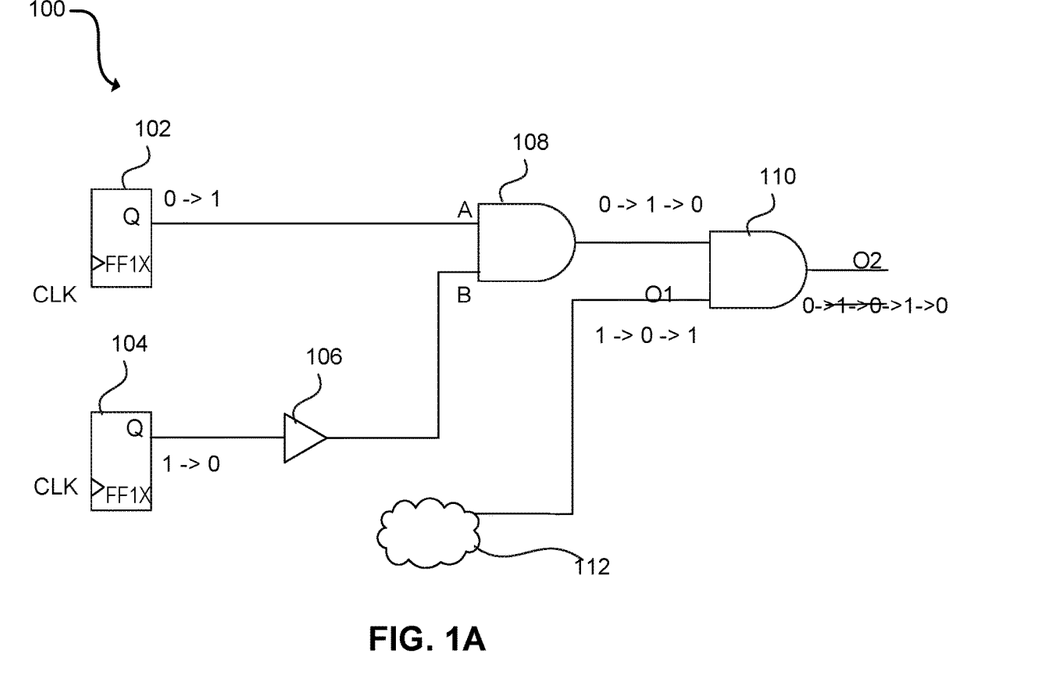
FIG. 1A illustrates an example circuit, in accordance with an embodiment of the present disclosure.

FIG. 1A illustrates an example circuit, in accordance with an embodiment of the present disclosure. A circuit 100 includes a first register 102 and a second register 104. An output of the second register 104 is connected to an input of a buffer 106. A first input of a first AND gate 108 is connected to the output of the first register 102 and a second input of the first AND gate is connected to the output of the buffer 106. The output of the first AND gate 108 is connected to a first input of a second AND gate 110. An input of a combinational logic cone 112 is connected to a second input of the second AND gate 110. As described further below, in an input file of the circuit design (e.g., circuit 100) all signals may be aligned with the clock signal. Delays are propagated in order to detect glitches in the circuit 100 as shown in FIG. 1B.

Figure 1B:
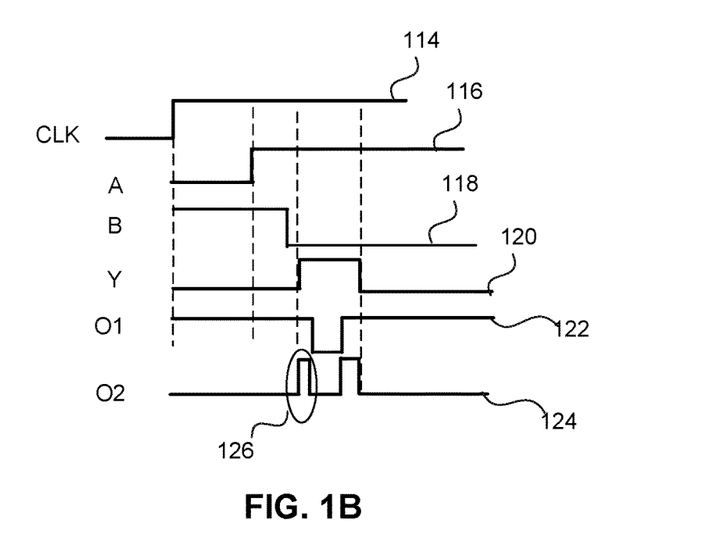
FIG. 1B illustrates a timing diagram corresponding to the example circuit, in accordance with an embodiment of the present disclosure.

FIG. 1B illustrates a timing diagram corresponding to the circuit 100, in accordance with an embodiment of the present disclosure. As shown in FIG. 1B, each signal may have different arrival time (i.e., shifted with respect to each other) which may or may not be aligned with the clock signal. For example, signals at the inputs of the first AND gate 108 may not be aligned due to delays. Waveform 114 shows the signal associated with the clock of the circuit 100. Waveform 116 shows signal A at the first input of the first AND gate 108. Waveform 118 shows signal B at the second input of the first AND gate 108. Waveform 120 shows signal Y at the output of the first AND gate 108. Waveform 122 shows a signal associated with output O1 of the combinational logic cone 112. Waveform 124 shows the signal associated with output O2 of the second AND gate 110.

The register outputs (i.e., signal A and signal B) are the simulation start points. The input signal A and the input signal B arrive at different times at the first AND gate 108 due to different path delays from the register outputs to the inputs of the first AND gate 108. This causes glitch pulses at the output Y of the first AND gate 108 (shown by the transition sequence 0→1→0 in FIG. 1A).

For the second AND gate 110, glitch pulses are present at both of the inputs. This cause the generation of four glitches at the output O2 of the second AND gate 110 (shown by 0→1→0 in FIG. 1A). The first two glitches (crossed) may be rejected or cancelled due to a very narrow pulse width as shown by 126 in FIG. 1B.

Figure 2:
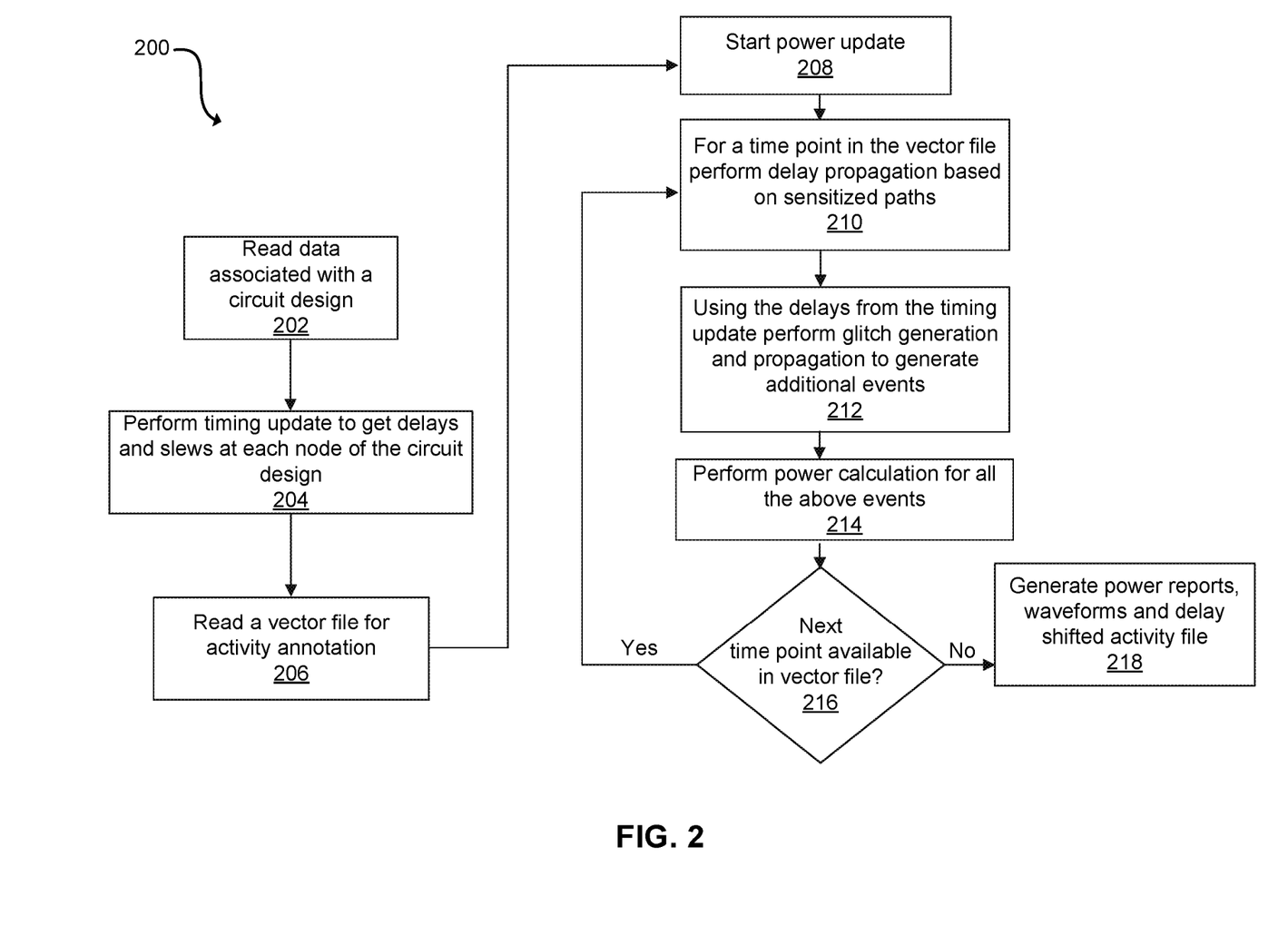
FIG. 2 illustrates a flowchart of a method for glitch power analysis, in accordance with an embodiment of the present disclosure.

FIG. 2 illustrates a flowchart of a method 200 for glitch power analysis, in accordance with an embodiment of the present disclosure. At 202, data associated with a circuit are acquired. In some embodiments, a source file associated with the circuit is acquired. For example, a hardware description language (HDL) file (e.g., Verilog file) including libraries (.lib/.db), design data (.v), constraints (.sdc), and parasitics (.spef) is read by a simulation tool. At 204, a time analysis including timing update is performed to determine timing data (e.g., delays, slews) at each node of the circuit design.

At 206, a RTL vector (e.g., .vcd/.fsdb) file is read. The RTL vector may be one or more zero-delay vectors associated with the design. The RTL vector does not include any delay and the signals are aligned with a clock signal of the circuit.

At 208, power analysis is performed. During power analysis, a simulation is performed using the RTL vector in which activities are chronologically propagated through the entire circuit design.

At 210, delay propagation is performed for a time point in the RTL vector file based on sensitized paths and the timing data. Delays are determined for every node (e.g., cells, nets, pins) of the circuit design. The circuit design is levelized as further described in FIG. 3. Primary inputs and register outputs are annotated in the RTL vector file. For example, if a register drives a cell A, starting from the register all events (arriving) for cell A are determined. Based on the arrival signal of each event, logical simulation is performed to propagate each event to the output. The delay propagation is based on the arc delay. The propagation is repeated for each level. For example, if the cell A drives a cell B. The delay is propagated to cell B.

At 212, glitch generation and propagation is performed to generate glitch events. The glitch generation and propagation is performed using the delays determined at 210. In some aspects, the glitch generation and propagation may be performed using the method shown and described in FIG. 3.

At 214, power calculation is performed for all the glitch events.

At 216, a determination is made to whether a next time point is available in the vector file. In response to determining that there is no additional time point available in the vector file, the process proceeds to 218. In response to determining that there is additional time point time in the vector file, the process goes back to step 210. At 218, one or more power reports are generated. For example, detailed power analysis (e.g., switch power, glitch power, leakage power) for each category (e.g., combinational register, black box) may be reported. In some embodiments, an instantaneous power waveform may be generated. The instantaneous power waveform may show the power for the entire circuit design with respect to time. Further, waveforms and delay shifted activity file are generated. The delay shifted activity file may be used by optimizing tools for glitch optimization.

Figure 3:
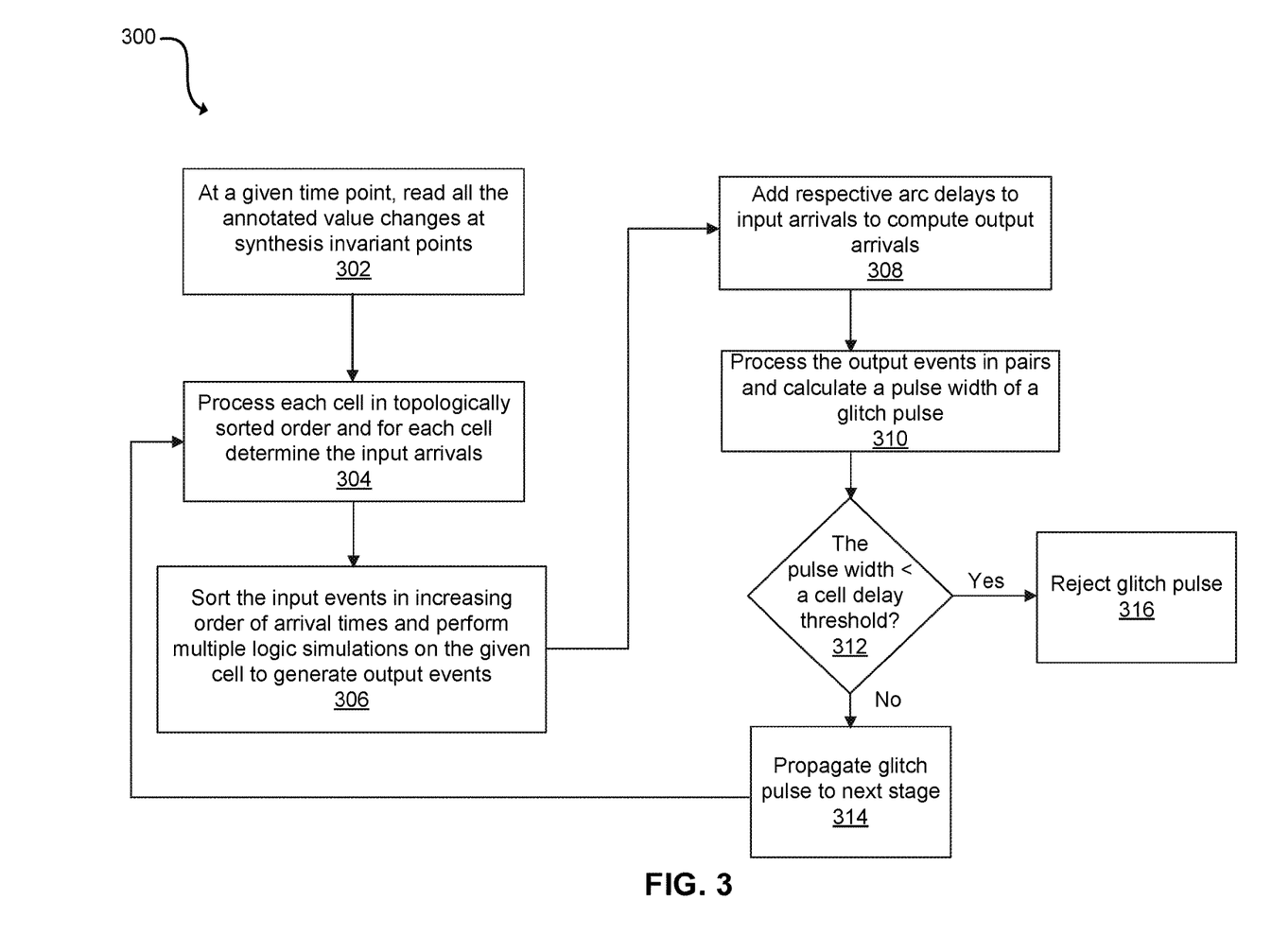
FIG. 3 illustrates a flowchart of a method for glitch propagation, in accordance with an embodiment of the present disclosure.

FIG. 3 illustrates a flowchart of a method 300 for glitch propagation, in accordance with an embodiment of the present disclosure. During the simulation/propagate stage (e.g., at step 212 of FIG. 2), glitch events are generated (due to the timing delays) and propagated through the design. Arrival times are calculated for these glitch events.

At 302, annotated value changes at synthesis invariant points are read for a given time point. At 304, input arrivals are determined for each cell. Each cell is processed in topologically sorted order.

At 306, the input events (e.g., for the delays) are sorted based on arrival times. In some embodiments, the input events are sorted in an increasing order of the arrival times. Output events are generated for a given cell by performing multiple logic simulations. In some aspects, the output events include glitches and regular toggles.

At 308, arc delays are added to respective input arrivals to determine output arrivals. For example, an AND gate may have input A, input B, and output Y. If input A causes a toggle on the output signal Y of the AND gate. The arrival of Y is a function of the arc delay between Y and A, and the arrival time of input A.

At 310, the output events are processed in pairs. A pulse width is determined for a glitch pulse (for two events). At 312, a determination is made to whether the pulse width is less than a cell delay threshold. In response to determining that the pulse width is less than the cell delay threshold, the glitch pulse is rejected and is not propagated. In response to determining that the pulse width is greater than the cell delay threshold, the process proceeds to 314. At 314, the glitch pulse is propagated to a next stage and the process proceeds to step 304. In some embodiments, the cell delay threshold may depend on the arc delays of the cell (e.g., an average value, a maximum value). Further, the cell delay threshold may be a glitch filter ratio as described previously herein. In some aspects, the glitch filter ratio may be a percentage of the cell delay. At 316, the glitch pulse is rejected and is not propagated. In some aspects, power is not determined for the rejected glitches.

In some embodiments, the glitch events are processed by a power calculation engine in chronological order so that state-dependent-path-dependent (SDPD) power can be calculated accurately for each glitch event. A glitch scaling ratio is calculated (e.g., based on pulse width and slew) as described previously herein. A de-rated dynamic power consumption associated with each glitch event is determined based on the glitch scaling ratio. The power consumption associated with each glitch event in then used to generate a real-time power waveform for the circuit design, and is also used to calculate the power of each instance in the design and to generate power reports for each hierarchy in the design.

Figure 4:
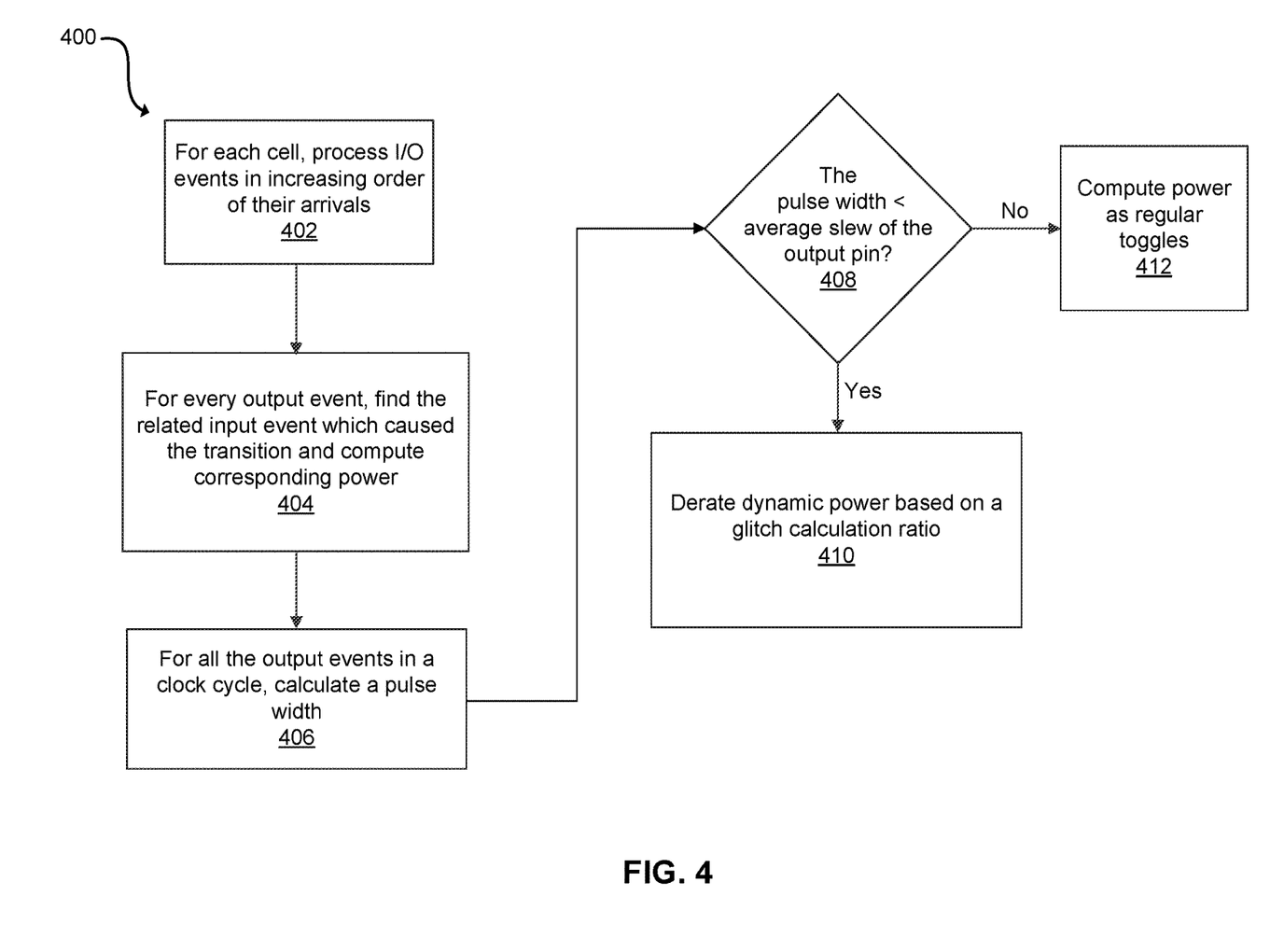
FIG. 4 illustrates a flowchart of a method for determining glitch power, in accordance with an embodiment of the present disclosure.

FIG. 4 illustrates a flowchart of a method 400 for determining glitch power, in accordance with an embodiment of the present disclosure. Events are processed by a power calculation engine to calculate power for each of these events (e.g., at step 214 of FIG. 2).

At 402, input and output events are process in increasing order of their arrivals for each cell. For example, if signal A arrives at 1 (time unit), B arrives at 4 (time unit), and Y arrives at 10 (time unit), then signal A is processed first, followed by signal B and Y.

At 404, a corresponding input event is identified for each output event. The corresponding input event corresponds to the input event which causes the transition. Then, a SDPD library look-up may be performed to determine the power for the arc (i.e., output event and the corresponding input event).

At 406, a pulse width is calculated for all the output events in a given clock cycle.

At 408, a determination is made to whether the pulse width is less than a predetermined threshold. In some embodiments, the predetermined threshold may be an average slew of the output pin. In response to determining that the pulse width is less than the predetermined threshold, the process proceeds to 410. In response to determining that the pulse width is greater than the predetermined threshold, the process proceeds to 412. In 412, the glitch is identified as a transport glitch. The transport glitch does not require power de-rating and is processed as a regular toggle.

At 410, the glitch is identified as an inertial glitch pulse. The dynamic power associated with the inertial glitch pulse is de-rated. In some aspects, the dynamic power is de-rated based on a glitch scaling ratio. In some aspects, the glitch scaling ratio is based on the pulse width and slew. In some aspects, the glitch scaling ratio is equal to gr=(pulse width/averageslew)^2. For example, the power determined at step 404 is multiplied by the glitch scaling ratio to obtain the power associated with the glitch.

In some embodiments, the power associated with each event is used for generating the real-time power waveform of the design. This is also used to calculate the power of each instance in the design and to generate power reports for each hierarchy in the design.

Figure 5:
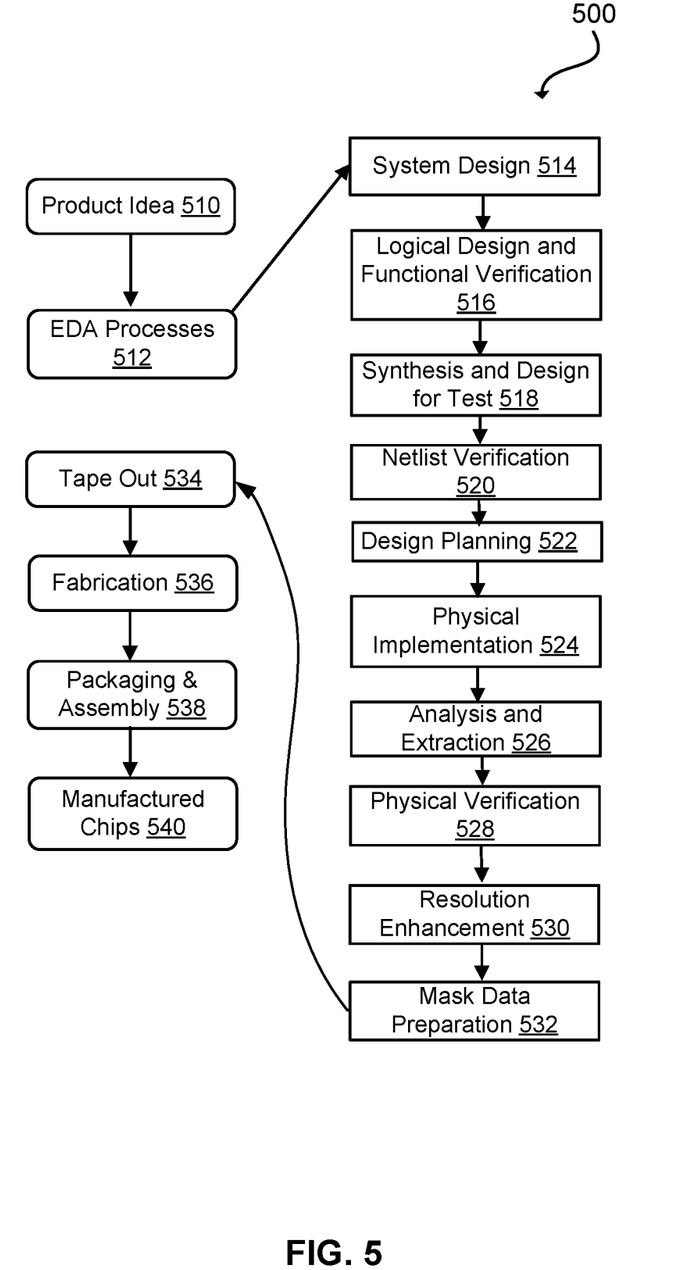
FIG. 5 depicts a flowchart of various processes used during the design and manufacture of an integrated circuit, in accordance with some embodiments of the present disclosure.

FIG. 5 illustrates an example set of processes 500 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 510 with information supplied by a designer, information which is transformed to create an article of manufacture that uses a set of EDA processes 512. When the design is finalized, the design is taped-out 534, which is when artwork (e.g., geometric patterns) for the integrated circuit is sent to a fabrication facility to manufacture the mask set, which is then used to manufacture the integrated circuit. After tape-out, a semiconductor die is fabricated 536 and packaging and assembly processes 538 are performed to produce the finished integrated circuit 540.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 5. The processes described can be enabled by EDA products (or tools).

During system design 514, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 516, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 518, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 520, the netlist is checked for compliance with timing constraints and for correspondence with the HDL code. During design planning 522, an overall floor plan for the integrated circuit is constructed and analyzed for timing and top-level routing.

During layout or physical implementation 524, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 526, the circuit function is verified at the layout level, which permits refinement of the layout design. During physical verification 528, the layout design is checked to ensure that manufacturing constraints are correct, such as DRC constraints, electrical constraints, lithographic constraints, and that circuitry function matches the HDL design specification. During resolution enhancement 530, the geometry of the layout is transformed to improve how the circuit design is manufactured.

During tape-out, data is created to be used (after lithographic enhancements are applied if appropriate) for production of lithography masks. During mask data preparation 532, the 'tape-out' data is used to produce lithography masks that are used to produce finished integrated circuits.

A storage subsystem of a computer system (such as computer system 600 of FIG. 6) may be used to store the programs and data structures that are used by some or all of the EDA products described herein, and products used for development of cells for the library and for physical and logical design that use the library.

Figure 6:
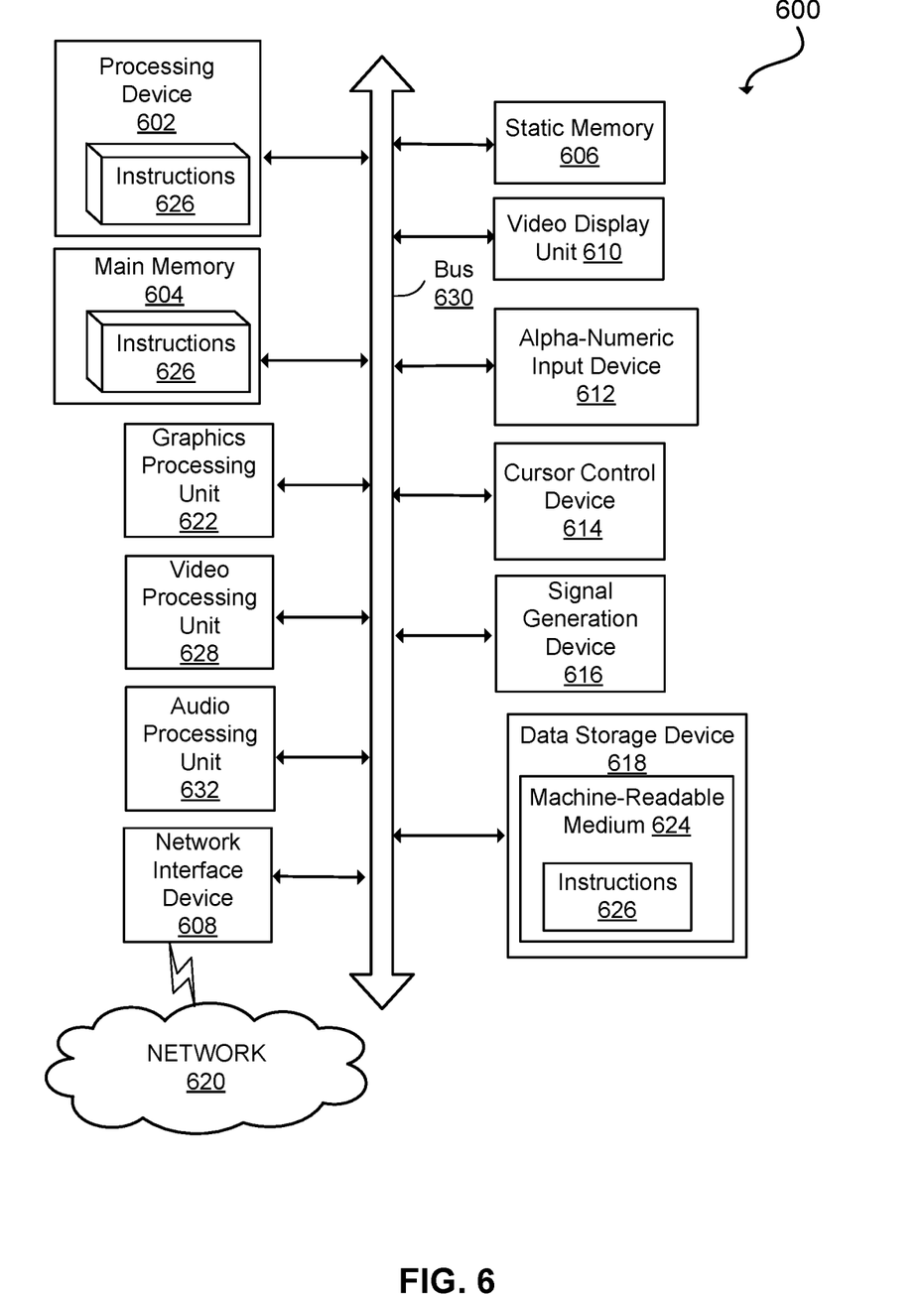
FIG. 6 depicts an abstract diagram of an example computer system in which embodiments of the present disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may be configured to execute instructions 626 for performing the operations and steps described herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a non-transitory computer-readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
    acquiring a zero-delay vector associated with a circuit design;
    performing, by a processor, a timing update using static timing analysis (STA) to determine timing information for the circuit design, wherein the timing information includes a signal delay associated with a cell of the circuit design;
    identifying a glitch in the circuit design based on a shifted vector waveform, wherein the shifted vector waveform is generated by shifting the zero-delay vector in a chronological order based on the timing information, and wherein the glitch is identified based on arrival times of input signals for the cell and output events determined at least based on the arrival times;
    filtering the glitch based on a pulse width of the glitch; and
    de-rating a power associated with the glitch as a function of the pulse width and an average slew when the pulse width is less than the average slew of an input pin of the cell.

2. The method of claim 1, wherein performing the timing update further comprises:
    generating STA timing data for the cell of the circuit design; and
    determining the signal delay using the STA timing data.

3. The method of claim 2, further comprising:
    incrementally shifting the zero-delay vector in the chronological order based on the STA timing data along a corresponding sensitized signal path of the circuit design, wherein the zero-delay vector is obtained from a register transfer level (RTL) simulation that does not model a cell delay.

4. The method of claim 1, further comprising:
    performing a power analysis for the circuit design that includes calculating the power associated with the glitch.

5. The method of claim 1, wherein identifying the glitch further comprises:
    determining the arrival times of input signals for the cell using the timing information;
    determining an order of arrival of the input signals based on the arrival times;
    determining the output events based on the arrival times, the order of arrival, and an arc delay;
    determining the pulse width of the glitch based on a difference of time arrivals of a pair of the output events; and
    filtering the glitch based on comparing the pulse width to a cell delay threshold.

6. The method of claim 5, further comprising:
    propagating the glitch in response to determining that the pulse width is greater than the cell delay threshold.

7. The method of claim 6, wherein the cell delay threshold is equal to 50% of a cell delay.

8. The method of claim 6, further comprising:
    determining a number of glitches in a net of the circuit design based on a number of propagated glitches.

9. A system comprising:
    a memory storing instructions; and a processor, coupled with the memory and to execute the instructions, the instructions when executed cause the processor to:
acquire a zero-delay vector associated with a circuit design,
perform a timing update using static timing analysis (STA) to determine timing information for the circuit design, wherein the timing information includes a signal delay associated with a cell of the circuit design,
identify a glitch in the circuit design based on a shifted vector waveform, wherein the shifted vector waveform is generated by shifting the zero-delay vector in a chronological order based on the timing information, and wherein the glitch is identified based on arrival times of input signals for the cell and output events determined at least based on the arrival times,
filter the glitch based on a pulse width of the glitch, and
de-rate a power associated with the glitch as a function of the pulse width and an average slew when the pulse width is less than the average slew of an input pin of the cell.

10. The system of claim 9, wherein the processor is further configured to:
generate STA timing data for the cell of the circuit design, and
determine the signal delay using the STA timing data.

11. The system of claim 10, wherein the processor is further configured to:
incrementally shift the zero-delay vector in the chronological order based on the STA timing data along a corresponding sensitized signal path of the circuit design, wherein the zero-delay vector is obtained from a register transfer level (RTL) simulation that does not model a cell delay.

12. The system of claim 9, wherein the processor is further configured to:
perform a power analysis for the circuit design that includes calculating the power associated with the glitch.

13. The system of claim 9, wherein the processor is further configured to:
determine the arrival times of input signals for the cell using the timing information;
determine an order of arrival of the input signals based on the arrival times;
determine the output events based on the arrival times, the order of arrival, and an arc delay;
determine the pulse width of the glitch based on a difference of time arrivals of a pair of the output events; and
filter the glitch based on comparing the pulse width to a cell delay threshold.

14. The system of claim 13, wherein the processor is further configured to:
propagate the glitch in response to determining that the pulse width is greater than the cell delay threshold.

15. A non-transitory computer readable medium comprising stored instructions, which when executed by a processor, cause the processor to perform operations comprising:
acquiring a zero-delay vector associated with a circuit design;
performing a timing update using static timing analysis (STA) to determine timing information for the circuit design, wherein the timing information includes a signal delay associated with a cell of the circuit design;
identifying a glitch in the circuit design based on a shifted vector waveform, wherein the shifted vector waveform is generated by shifting the zero-delay vector in a chronological order based on the timing information, and wherein the glitch is identified based on arrival times of input signals for the cell and output events determined at least based on the arrival times;
filtering the glitch based on a pulse width of the glitch; and
de-rating a power associated with the glitch as a function of the pulse width and an average slew when the pulse width is less than the average slew of an input pin of the cell.

16. The non-transitory computer readable medium of claim 15, wherein performing the timing update further comprises:
generating STA timing data for the cell of the circuit design; and
determining the signal delay using the STA timing data.

17. The non-transitory computer readable medium of claim 16, the operations further comprising:
incrementally shifting the zero-delay vector in the chronological order based on the STA timing data along a corresponding sensitized signal path of the circuit design, wherein the zero-delay vector is obtained from a register transfer level (RTL) simulation that does not model a cell delay.

18. The non-transitory computer readable medium of claim 15, the operations further comprising:
performing a power analysis for the circuit design that includes calculating the power associated with the glitch.

* * * * *